(12) United States Patent
Nishizaka

(10) Patent No.: US 9,489,979 B2
(45) Date of Patent: Nov. 8, 2016

(54) IMAGE PROCESSING APPARATUS FOR TIME-LAPSE MOVING IMAGE, IMAGE PROCESSING METHOD, AND STORAGE MEDIUM

(71) Applicant: CASIO COMPUTER CO., LTD., Shibuya-ku, Tokyo (JP)

(72) Inventor: Nobuyoshi Nishizaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 23 days.

(21) Appl. No.: 14/332,013

(22) Filed: Jul. 15, 2014

(65) Prior Publication Data
US 2015/0043893 A1  Feb. 12, 2015

(30) Foreign Application Priority Data

Aug. 6, 2013  (JP) .................... 2013-163237
Aug. 22, 2013  (JP) .................... 2013-172336
Apr. 25, 2014  (JP) .................... 2014-090791

(51) Int. Cl.
| | | |
|---|---|---|
| G11B 27/00 | (2006.01) | |
| H04N 5/93 | (2006.01) | |
| H04N 5/77 | (2006.01) | |

(Continued)

(52) U.S. Cl.
CPC ............ *G11B 27/005* (2013.01); *G11B 27/034* (2013.01); *H04N 5/772* (2013.01); *H04N 9/8042* (2013.01)

(58) Field of Classification Search
CPC .................................................. H04N 5/772
USPC ......................................................... 386/278
See application file for complete search history.

(56) References Cited

U.S. PATENT DOCUMENTS

| 7,450,162 B2 | 11/2008 | Shioji et al. | |
|---|---|---|---|
| 2003/0107657 A1* | 6/2003 | Shioji ................... | H04N 5/772 348/220.1 |
| 2008/0088710 A1* | 4/2008 | Iwamoto ............ | H04N 1/32128 348/220.1 |

FOREIGN PATENT DOCUMENTS

| JP | 11212139 A | 8/1999 |
|---|---|---|
| JP | 2001298693 A | 10/2001 |
| JP | 2003324651 A | 11/2003 |

(Continued)

OTHER PUBLICATIONS

Japanese Office Action dated Nov. 18, 2014, issued in counterpart Japanese Application No. 2014-090791.

(Continued)

*Primary Examiner* — Hung Dang
*Assistant Examiner* — Girumsew Wendmagegn
(74) *Attorney, Agent, or Firm* — Holtz, Holtz & Volek PC

(57) ABSTRACT

An image capture apparatus includes a photographic scene selection section and a parameter setting section. The photographic scene selection section selects a photographic scene. The parameter setting section independently sets, according to the photographic scene selected by the photographic scene selection section, each of a photographing parameter relating to time-lapse photography that captures images at a predetermined interval and generates a moving image with a shorter playback time than photographing time, and a playback parameter relating to playback of a time-lapse moving image photographed at the photographing parameter.

19 Claims, 9 Drawing Sheets

(51) Int. Cl.
  *H04N 9/804* (2006.01)
  *G11B 27/034* (2006.01)

(56) References Cited

FOREIGN PATENT DOCUMENTS

| JP | 2004126242 A | 4/2004 |
|---|---|---|
| JP | 2006332746 A | 12/2006 |
| JP | 2007150993 A | 6/2007 |
| JP | 2007202072 A | 8/2007 |
| JP | 2010016599 A | 1/2010 |
| JP | 2010200362 A | 9/2010 |
| JP | 2011223399 A | 11/2011 |

OTHER PUBLICATIONS

Japanese Office Action dated Jan. 27, 2015, issued in counterpart Japanese Application No. 2013-172336.

* cited by examiner

FIG. 4A

TIME-LAPSE PHOTOGRAPHY

| PHOTO-GRAPHIC SCENE | PHOTOGRAPHING PARAMETER RELATING TO TIME | | PHOTOGRAPHING PARAMETER RELATING TO IMAGE QUALITY | | | |
|---|---|---|---|---|---|---|
| | PHOTO-GRAPHING INTERVAL | PHOTO-GRAPHING TIME | EXPOSURE | WHITE BALANCE | FOCUS | EV SHIFT |
| 1 STANDARD | 1/2 SEC | 5 MIN | AE CONTINUOUS (SUBJECT TRACKING) | AWB CONTINUOUS (SUBJECT TRACKING) | AF LOCK | ±0 |
| 2 CLOUDY | 5 SEC | 30 MIN | AE LOCK*1 | AWB LOCK*1 | ∞FIXED*2 | ±0 |
| 3 NIGHTSCAPE | 3 SEC | 30 MIN | AE LOCK*1 | AWB LOCK*1 | AF LOCK | ±0 |
| 4 EVENING | 10 SEC | 60 MIN | AE CONTINUOUS (SUBJECT TRACKING) | AWB LOCK*1 | ∞FIXED*2 | −0.3 |
| 5 VEHICLE | 1 SEC | 20 MIN | AE CONTINUOUS (SUBJECT TRACKING) | AWB CONTINUOUS (SUBJECT TRACKING) | AF LOCK | ±0 |
| 6 TOWNSCAPE | 1/2 SEC | 5 MIN | AE CONTINUOUS (SUBJECT TRACKING) | AWB CONTINUOUS (SUBJECT TRACKING) | AF LOCK | ±0 |
| 7 HDR ART | 1/2 SEC | 5 MIN | AE CONTINUOUS (SUBJECT TRACKING) | AWB CONTINUOUS (SUBJECT TRACKING) | AF LOCK | ±0 |
| 8 TOY CAMERA | 1/2 SEC | 5 MIN | AE CONTINUOUS (SUBJECT TRACKING) | AWB CONTINUOUS (SUBJECT TRACKING) | AF LOCK | ±0 |
| 9 MONOCHROME | 1/2 SEC | 5 MIN | AE CONTINUOUS (SUBJECT TRACKING) | AWB CONTINUOUS (SUBJECT TRACKING) | AF LOCK | ±0 |
| 10 MINIATURE | 1/2 SEC | 5 MIN | AE CONTINUOUS (SUBJECT TRACKING) | AWB CONTINUOUS (SUBJECT TRACKING) | AF LOCK | ±0 |
| 11 FISH EYE | 1/2 SEC | 5 MIN | AE CONTINUOUS (SUBJECT TRACKING) | AWB CONTINUOUS (SUBJECT TRACKING) | AF LOCK | ±0 |

*1: FIXED AT VALUE IMMEDIATELY BEFORE PHOTOGRAPHY
*2: PRESET VALUE

FIG. 4B

NORMAL MOVING IMAGE PHOTOGRAPHY

| PHOTO-GRAPHIC SCENE | PHOTOGRAPHING PARAMETER RELATING TO TIME | | PHOTOGRAPHING PARAMETER RELATING TO IMAGE QUALITY | | | |
|---|---|---|---|---|---|---|
| | PHOTO-GRAPHING INTERVAL | PHOTO-GRAPHING TIME | EXPOSURE | WHITE BALANCE | FOCUS | EV SHIFT |
| 1 STANDARD | NONE | NONE | AE CONTINUOUS (SUBJECT TRACKING) | AWB CONTINUOUS (SUBJECT TRACKING) | AF LOCK | ±0 |
| 2 CLOUDY | NONE | NONE | AE CONTINUOUS (SUBJECT TRACKING) | AWB CONTINUOUS (SUBJECT TRACKING) | ∞FIXED*2 | ±0 |
| 3 NIGHTSCAPE | NONE | NONE | AE LOCK*1 | AWB LOCK*1 | AF LOCK | ±0 |
| 4 EVENING | NONE | NONE | AE CONTINUOUS (SUBJECT TRACKING) | AWB CONTINUOUS (SUBJECT TRACKING) | ∞FIXED*2 | -0.3 |
| 5 VEHICLE | NONE | NONE | AE CONTINUOUS (SUBJECT TRACKING) | AWB CONTINUOUS (SUBJECT TRACKING) | AF LOCK | ±0 |
| 6 TOWNSCAPE | NONE | NONE | AE CONTINUOUS (SUBJECT TRACKING) | AWB CONTINUOUS (SUBJECT TRACKING) | AF LOCK | ±0 |
| 7 HDR ART | NONE | NONE | AE CONTINUOUS (SUBJECT TRACKING) | AWB CONTINUOUS (SUBJECT TRACKING) | AF LOCK | ±0 |
| 8 TOY CAMERA | NONE | NONE | AE CONTINUOUS (SUBJECT TRACKING) | AWB CONTINUOUS (SUBJECT TRACKING) | AF LOCK | ±0 |
| 9 MONOCHROME | NONE | NONE | AE CONTINUOUS (SUBJECT TRACKING) | AWB CONTINUOUS (SUBJECT TRACKING) | AF LOCK | ±0 |
| 10 MINIATURE | NONE | NONE | AE CONTINUOUS (SUBJECT TRACKING) | AWB CONTINUOUS (SUBJECT TRACKING) | AF LOCK | ±0 |
| 11 FISH EYE | NONE | NONE | AE CONTINUOUS (SUBJECT TRACKING) | AWB CONTINUOUS (SUBJECT TRACKING) | AF LOCK | ±0 |

*1: FIXED AT VALUE IMMEDIATELY BEFORE PHOTOGRAPHY
*2: PRESET VALUE

FIG. 6A

TIME-LAPSE PHOTOGRAPHY

| PHOTO-GRAPHIC SCENE | PHOTOGRAPHING PARAMETER RELATING TO TIME | | PHOTOGRAPHING PARAMETER RELATING TO IMAGE QUALITY | | | | PLAYBACK PARAMETER | |
|---|---|---|---|---|---|---|---|---|
| | PHOTO-GRAPHING INTERVAL | PHOTO-GRAPHING TIME | EXPOSURE | WHITE BALANCE | FOCUS | EV SHIFT | PLAYBACK FRAME RATE | PLAYBACK TIME |
| 1 STANDARD | 1/2 SEC | 5 MIN | AE CONTINUOUS (SUBJECT TRACKING) | AWB CONTINUOUS (SUBJECT TRACKING) | AF LOCK | ±0 | 20fps | 30 SEC |
| 2 CLOUDY | 5 SEC | 30 MIN | AE LOCK*1 | AWB LOCK*1 | ∞FIXED*2 | ±0 | 15fps | 24 SEC |
| 3 NIGHTSCAPE | 3 SEC | 30 MIN | AE LOCK*1 | AWB LOCK*1 | AF LOCK | ±0 | 15fps | 40 SEC |
| 4 EVENING | 10 SEC | 60 MIN | AE CONTINUOUS (SUBJECT TRACKING) | AWB LOCK*1 | ∞FIXED*2 | -0.3 | 30fps | 12 SEC |
| 5 VEHICLE | 1 SEC | 20 MIN | AE CONTINUOUS (SUBJECT TRACKING) | AWB CONTINUOUS (SUBJECT TRACKING) | AF LOCK | ±0 | 20fps | 60 SEC |
| 6 TOWNSCAPE | 1/2 SEC | 5 MIN | AE CONTINUOUS (SUBJECT TRACKING) | AWB CONTINUOUS (SUBJECT TRACKING) | AF LOCK | ±0 | 20fps | 30 SEC |
| 7 HDR ART | 1/2 SEC | 5 MIN | AE CONTINUOUS (SUBJECT TRACKING) | AWB CONTINUOUS (SUBJECT TRACKING) | AF LOCK | ±0 | 20fps | 30 SEC |
| 8 TOY CAMERA | 1/2 SEC | 5 MIN | AE CONTINUOUS (SUBJECT TRACKING) | AWB CONTINUOUS (SUBJECT TRACKING) | AF LOCK | ±0 | 20fps | 30 SEC |
| 9 MONOCHROME | 1/2 SEC | 5 MIN | AE CONTINUOUS (SUBJECT TRACKING) | AWB CONTINUOUS (SUBJECT TRACKING) | AF LOCK | ±0 | 20fps | 30 SEC |
| 10 MINIATURE | 1/2 SEC | 5 MIN | AE CONTINUOUS (SUBJECT TRACKING) | AWB CONTINUOUS (SUBJECT TRACKING) | AF LOCK | ±0 | 20fps | 30 SEC |
| 11 FISH EYE | 1/2 SEC | 5 MIN | AE CONTINUOUS (SUBJECT TRACKING) | AWB CONTINUOUS (SUBJECT TRACKING) | AF LOCK | ±0 | 20fps | 30 SEC |

*1: FIXED AT VALUE IMMEDIATELY BEFORE PHOTOGRAPHY
*2: PRESET VALUE

FIG. 6B

NORMAL MOVING IMAGE PHOTOGRAPHY

| PHOTO-GRAPHIC SCENE | PHOTOGRAPHING PARAMETER RELATING TO TIME | | PHOTOGRAPHING PARAMETER RELATING TO IMAGE QUALITY | | | | PLAYBACK PARAMETER | |
|---|---|---|---|---|---|---|---|---|
| | PHOTO-GRAPHING FRAME RATE | PHOTO-GRAPHING TIME | EXPOSURE | WHITE BALANCE | FOCUS | EV SHIFT | PLAYBACK FRAME RATE | PLAYBACK TIME |
| 1 STANDARD | 15/20/30fps | | AE CONTINUOUS (SUBJECT TRACKING) | AWB CONTINUOUS (SUBJECT TRACKING) | AF LOCK | ±0 | CONFORM TO PHOTO-GRAPHING FRAME RATE DURING PHOTO-GRAPHING | NONE |
| 2 CLOUDY | 20fps | | AE CONTINUOUS (SUBJECT TRACKING) | AWB CONTINUOUS (SUBJECT TRACKING) | ∞FIXED*2 | ±0 | | |
| 3 NIGHTSCAPE | 20fps | | AE LOCK*1 | AWB LOCK*1 | AF LOCK | ±0 | | |
| 4 EVENING | 20fps | | AE CONTINUOUS (SUBJECT TRACKING) | AWB CONTINUOUS (SUBJECT TRACKING) | ∞FIXED*2 | -0.3 | | |
| 5 VEHICLE | 20fps | NONE | AE CONTINUOUS (SUBJECT TRACKING) | AWB CONTINUOUS (SUBJECT TRACKING) | AF LOCK | ±0 | | |
| 6 TOWNSCAPE | 20fps | | AE CONTINUOUS (SUBJECT TRACKING) | AWB CONTINUOUS (SUBJECT TRACKING) | AF LOCK | ±0 | | |
| 7 HDR ART | 15fps | | AE CONTINUOUS (SUBJECT TRACKING) | AWB CONTINUOUS (SUBJECT TRACKING) | AF LOCK | ±0 | | |
| 8 TOY CAMERA | 15fps | | AE CONTINUOUS (SUBJECT TRACKING) | AWB CONTINUOUS (SUBJECT TRACKING) | AF LOCK | ±0 | | |
| 9 MONOCHROME | 15fps | | AE CONTINUOUS (SUBJECT TRACKING) | AWB CONTINUOUS (SUBJECT TRACKING) | AF LOCK | ±0 | | |
| 10 MINIATURE | 15fps | | AE CONTINUOUS (SUBJECT TRACKING) | AWB CONTINUOUS (SUBJECT TRACKING) | AF LOCK | ±0 | | |
| 11 FISH EYE | 15fps | | AE CONTINUOUS (SUBJECT TRACKING) | AWB CONTINUOUS (SUBJECT TRACKING) | AF LOCK | ±0 | | |

*1: FIXED AT VALUE IMMEDIATELY BEFORE PHOTOGRAPHY
*2: PRESET VALUE

IMAGE PROCESSING APPARATUS FOR TIME-LAPSE MOVING IMAGE, IMAGE PROCESSING METHOD, AND STORAGE MEDIUM

This application is based on and claims the benefit of priority from Japanese Patent Application Nos. 2013-163237 and 2013-172336, respectively filed on 6 Aug. 2013 and 22 Aug. 2013, the contents of which are incorporated herein by reference.

BACKGROUND OF THE INVENTION

1. Field of the Invention

The present invention relates to an image processing apparatus, image processing method, and a storage medium.

2. Related Art

Conventionally, technology for generating a moving image file by setting a plurality of static images photographed at a fixed interval as each frame has been disclosed, for example, in Japanese Unexamined Patent Application, Publication No. 2010-16599.

Such file generation technology is often used for efficiently checking a large amount of static images acquired by photographing with a security camera, for example. However, opportunities for using such time-lapse photography in application scenes other than fixed-point photography have increased recently. For example, there are also cases where a camera is mounted to a moving object such as human so as to enjoy the changes in scenery photographed through the eyesight of the moving object.

Furthermore, concerning interval photography for photographing a plurality of static images at a fix interval, technology for judging the importance of a captured image without fixing a interval, and changing the interval of photographing according to this importance has been disclose as in, for example, Japanese Unexamined Patent Application, Publication No. 2007-150993.

SUMMARY OF THE INVENTION

According to a first aspect of the present invention, an image processing apparatus includes: a photographic scene selection section that selects a photographic scene; and a parameter setting section that independently sets, according to the photographic scene selected by way of the photographic scene selection section, each of a photographing parameter relating to time-lapse photography that captures images at a predetermined interval and generates a moving image of a shorter playback time than a photographing time, and a playback parameter relating to playing of a time-lapse moving image captured at the photographing parameter.

According to a second aspect of the present invention, a method for processing images includes: a photographic scene selecting step of selecting a photographic scene; and a parameter setting step of independently setting, according to the photographic scene selected in the photographic scene selecting step, each of a photographing parameter relating to time-lapse photography that photographs images at a predetermined interval and generates a moving image for which a playback time is shorter than a photographing time, and a playback parameter relating to playback of a time-lapse moving image photographed at the photographing parameter.

According to a third aspect of the present invention, a non-transitory computer readable storage medium encoded with a program that enables a computer controlling image processing to realize: a photographic scene selecting function of selecting a photographic scene; and a parameter setting function of independently setting, according to the photographic scene selected in the photographic scene selecting function, each of a photographing parameter relating to time-lapse photography that photographs images at a predetermined interval and generates a moving image for which a playback time is shorter than a photographing time, and a playback parameter relating to playback of a time-lapse moving image photographed at the photographing parameter.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 4A and 4B provide specific examples of parameter tables;

FIGS. 6A and 6B provide other specific examples of parameter tables; and

DETAILED DESCRIPTION OF THE INVENTION

Figure 1:
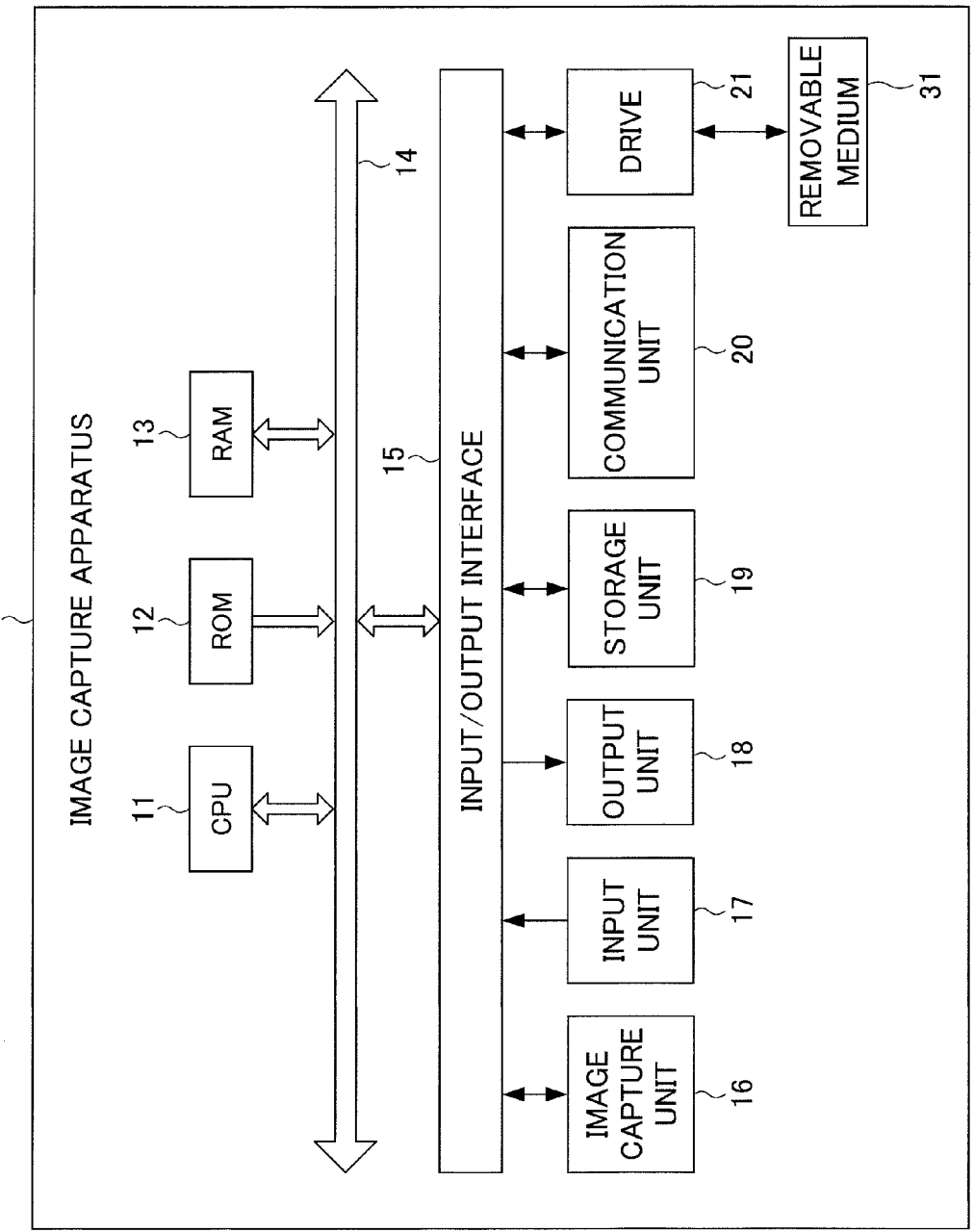
FIG. 1 is a block diagram showing a hardware configuration of an image capture apparatus according to an embodiment of an image processing apparatus of the present invention.

In the following, embodiments of the present invention will be explained with reference to the drawings.
First Embodiment FIG. 1 is a block diagram showing a hardware configuration of an image capture apparatus 1 according to an embodiment of an image processing apparatus of the present invention.

The image capture apparatus 1 is configured as, for example, a digital camera.

The image capture apparatus 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

With the image capture unit 16, it is possible to perform control of auto focus (AF) by adjusting the optical lens unit, control of auto exposure (AE) and auto white balance (AWB) by way of peripheral circuits provided to the optical lens unit, etc.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

The input unit 17 is configured by various buttons such as for the shutter, and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

With such an image capture apparatus 1, it is possible to generate a time-lapse moving image by performing time-lapse photography with predetermined settings according to photographing conditions.

"Time-lapse photography" joins a plurality of images photographed at fixed intervals to generate a moving image file to be played back in a time shorter than the photographing time, whereby changes in photographed images appear to fast forward. The moving image generated in such a way may be referred to as time-lapse moving image.

In the present embodiment, time-lapse photography refers to a technology for photographing so as to intermittently acquire images at a fixed interval by way of photography (hereinafter, referred to as "interval photography"), and generating a time-lapse moving image by joining the images thus acquired.

Figure 2:
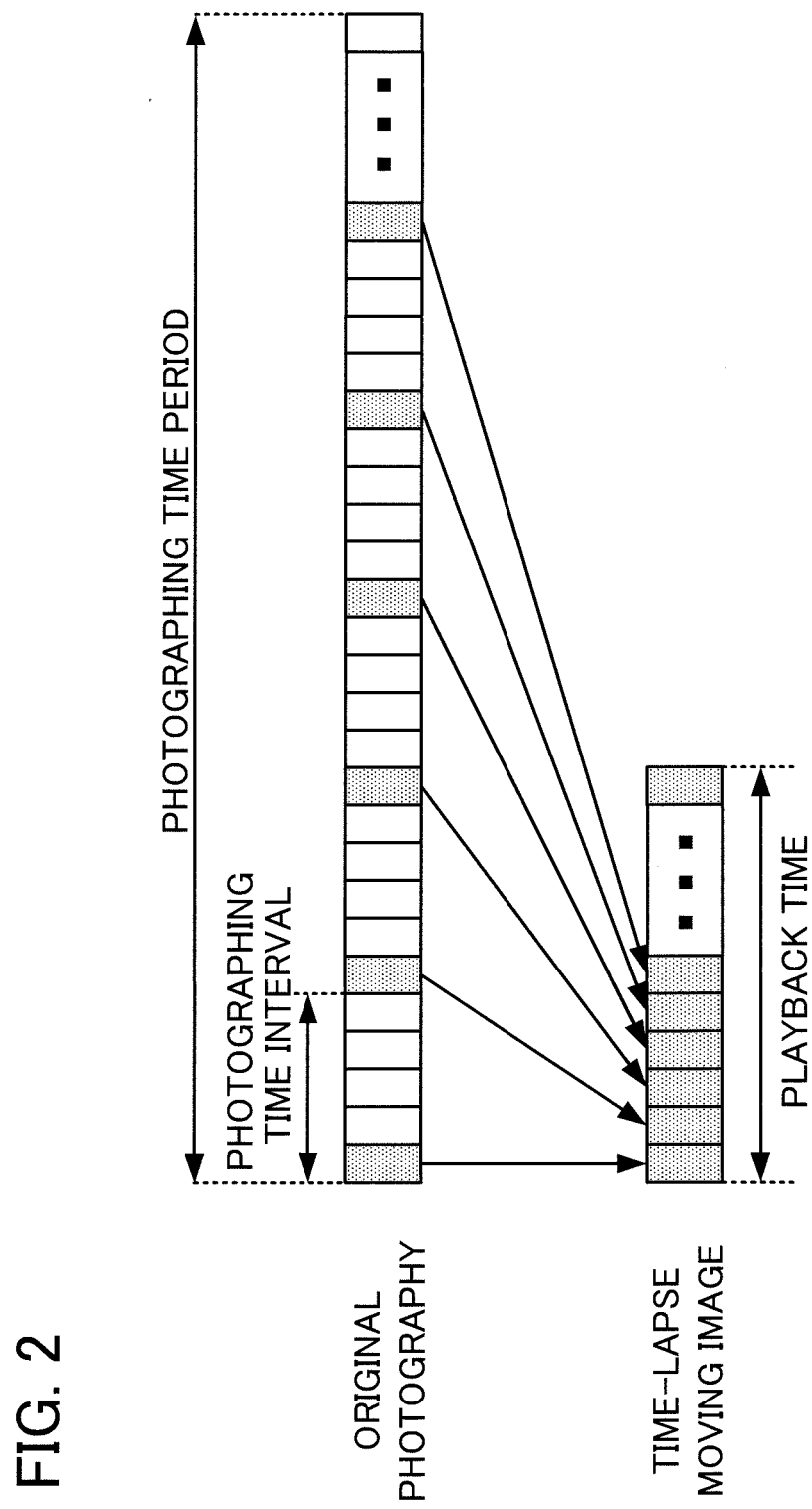
FIG. 2 is a schematic diagram illustrating time-lapse photography.

FIG. 2 is a schematic view illustrating time-lapse photography.

As shown in FIG. 2, time-lapse photography in the present embodiment performs interval photography that acquires images spaced apart by a fixed photographing interval as images constituting a time-lapse moving image (hereinafter, referred to as "constitutional image"). Then, in the time-lapse photography, the time-lapse moving image is generated by joining the constitutional images thus acquired as a single moving image. For the time-lapse moving image thus generated, the playback time is different from the actual photographing time of the original photography, and thus is a moving image with the playback time composed of the number of constitutional images thus combined.

The time-lapse moving image generated in this way is a favorable moving image produced according to the photographed subject and photographing conditions, by changing the photography settings such as photographing interval, exposure, white balance and focus, for example. Furthermore, the time-lapse moving image can, for example, be made monochrome and produce an effect on an image as if photographing miniatures.

Furthermore, the time-lapse photography in the present embodiment changes the photography settings according to the effect imparted on a photographed subject and a moving image. The setting for photography is conducted by way of selection of a photographic scene. However, it is also possible for a user to set arbitrarily.

Figure 3:
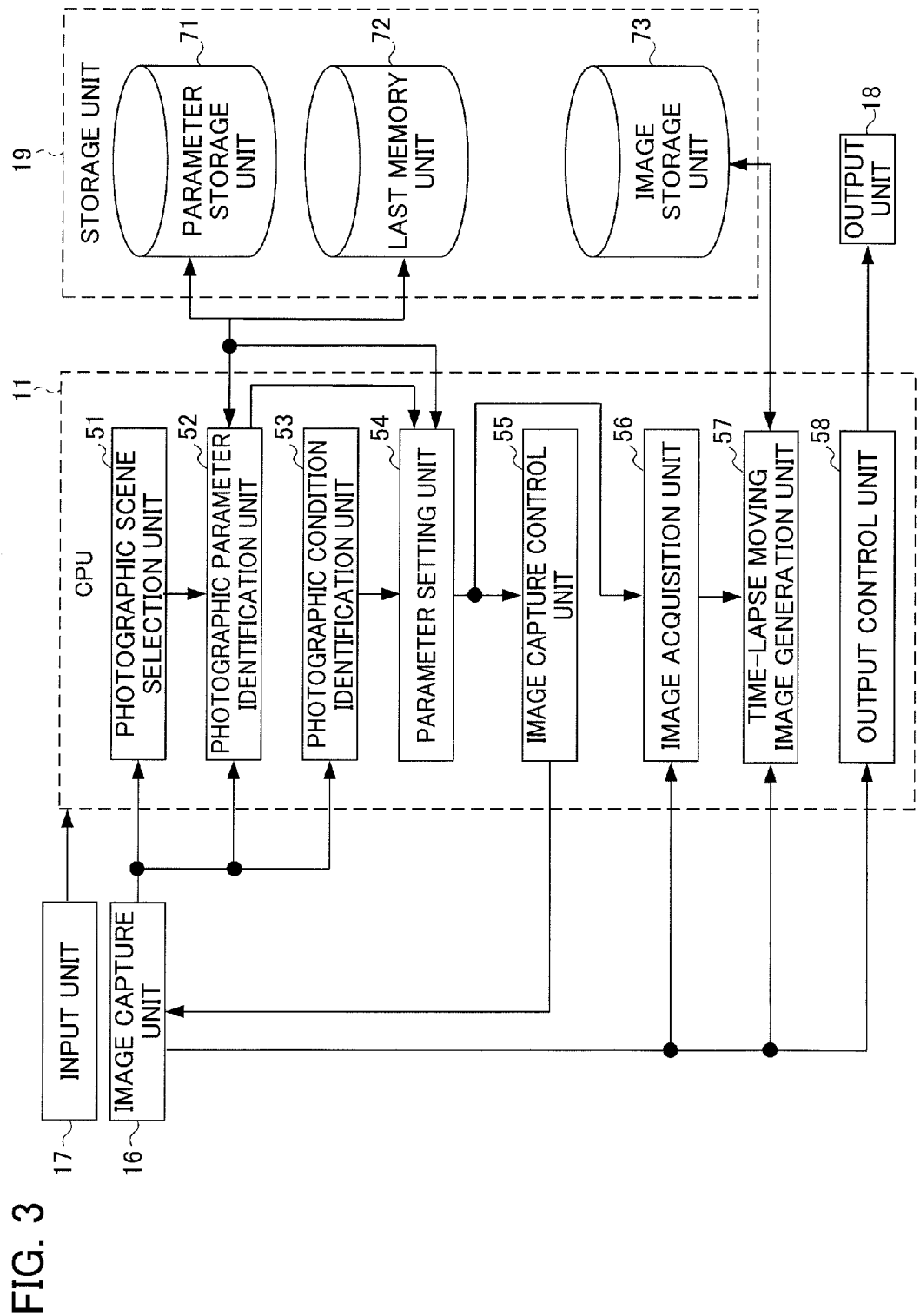
FIG. 3 is a functional block diagram showing, among the functional configurations of the image capture apparatus of FIG. 1, a functional configuration for executing time-lapse photography processing.

FIG. 3 is a functional block diagram showing a functional configuration for executing time-lapse photography processing among the functional configurations of such an image capture apparatus 1.

"Time-lapse photography processing" refers to a sequence of processing of judging a photographic scene, performing interval photography at photographing conditions appropriate to the photographic scene thus judged, and generating a time-lapse moving image based on a constitutional image acquired by the photography.

In a case of executing the time-lapse photography processing, a photographic scene selection unit 51, a photographing parameter judgment unit 52, a photographing condition judgment unit 53, a parameter setting unit 54, an image capture control unit 55, an image acquisition unit 56, a time-lapse moving image generation unit 57, and an output control unit 58 function in the CPU 11.

In an area of the storage unit 19, a parameter storage unit 71, a last memory unit 72 and an image storage unit 73 are provided.

A parameter table is stored in the parameter storage unit 71. The parameter table is a table in which photographic scenes are associated with various parameters in relation to the time-lapse photography for settings relating to the interval photography and the settings for the generation of a time-lapse moving image. Furthermore, in the parameter table, there may be parameters set for each photographic scene beforehand and parameters arbitrarily settable by a user.

FIG. 4 is a diagram for illustrating a specific example of a parameter table stored in the parameter storage unit 71.

As shown in FIG. 4A, in the parameter table, various parameters are associated for each "photographic scene".

The associated "photographic scenes" are roughly classified into those establishing according to a photographed subject or a condition upon photography, and those imparting a predetermined visual effect to a moving image generated.

More specifically, "photographic scene" includes the following items: "standard": a photographed subject and a condition upon photography are not specified and no effects are added; "cloud": a photographed subject includes a cloud; "nightscape": photography is performed at night; "evening": photography is performed at evening; "vehicle": a photographed subject is a vehicle or photography while in a vehicle; "townscape": a photographed subject is a town; "HDR art": an effect of HDR art is added; "toy camera": an effect produced by photographing with a toy camera; "monochrome": making an image monochrome; "miniature": a miniature-like effect is produced; and "fish eye": an effect produced by photographing with a fish eye lens is added.

Furthermore, various parameters are roughly classified into "photographing parameters relating to time" and "photographing parameters relating to image quality".

The photographing parameters relating to time are parameters relating to a time component, and thus a photographing parameter setting the timing for acquiring constitutional images that constitutes a time-lapse moving image and the length of the time-lapse moving image.

More specifically, the photographing parameters relating to time are composed of "photographing interval" indicating the timing of acquiring constitutional images from the images captured and "photographing time" indicating the length of the time-lapse moving image.

Regarding "photographing interval", if it becomes too short, it will simply seem to be a (consecutive) moving image; whereas, if it becomes too long, it will simply become a high-light moving that is jumpy. Therefore, in a case of a user photographing manually, a lot of time is consumed for the user to learn a photographing interval specific to time lapse or the user simply gives up in the middle. However, with the image capture apparatus 1, it is possible to enjoy time lapse efficiently since the optimum settings for a photographic scene are preset.

Regarding the "photographing time", if the playback time of a moving image becomes too long, it becomes boring; whereas, if it becomes too short, it is not possible to know what happens therein. Furthermore, there are parameters like playback time that are appropriate depending on the photographic scene. With the image capture apparatus 1, a photographing time that matches the playback time according to a photographic scene is preset.

The photographing parameters relating to image quality are parameter relating to image quality elements of a time-lapse moving image and are photographing parameters setting control upon photography in the image capture unit 16.

More specifically, the photographing parameters relating to image quality are composed of "exposure", which is a setting relating to exposure, "white balance", which is a setting relating to white balance, "focus" which is a setting relating to focus, and "EV (Exposure Value) shift" which is a setting relating to exposure compensation.

Furthermore, the photographing parameters relating to "exposure", "white balance", and "focus" among the photographing parameters relating to image quality are used selectively by setting to fix-type or tracking-type, depending according to the photographic scene.

For "exposure", for example, if setting to fixed-type with an evening scene, exposure is fixed upon the start of photography, a result of which it will no longer be the proper exposure after sunset, and produces undesired images. Therefore, by setting to tracking-type, since it is possible to track the brightness according to the exposure before and after sunset, it is possible to maintain clear photographing from the evening scene before sunset up to a neon nightscape scene after sunset. However, since flickering diminishes and images are stabilized with the fixed-type parameter depending on a photographic scene, the fixed-type parameter is employed for cloud and nightscape scenes.

For "white balance", since flickering diminishes and images are stabilized with the fixed-type parameter for photographic scenes such as cloud and nightscape which do not require adjustment relatively, the "white balance" is set to fixed-type parameter. On the other hand, since visual quality improves with the tracking-type for other scenes, it is set to tracking-type therefor.

Regarding "focus", since the sky is photographed at infinity for cloud and evening scenes, it is not desirable to bring a bird or the like accidentally coming into the frame during photography into focus; therefore, focus is fixed at infinity. On the other hand, since focus is reliably followed with tracking for other scenes, tracking is employed therefor.

The setting differs between photographing parameters in such time-lapse photography and the photographing parameters in normal moving image photography.

As can be understood even when comparing between the photographing parameters in the time-lapse photography shown in FIG. 4A and the photographing parameters in the normal moving image photography shown in FIG. 4B, for the time-lapse photography for the photographic scene "cloud", the initial value of "exposure" is set to "AE lock" and the initial value of "white balance" is set to "AWB lock", and for the normal moving image photography, the initial value of "exposure" is set to "AE tracking" and the initial value of "white balance" is set to "AWB tracking". This is because, compared with time-lapse photography, the change is gradual in normal moving image photography; therefore, by tracking the exposure and white balance, an out of place feeling as a moving image will not be imparted to the generated time-lapse moving image.

For each photographing parameter in each photographic scene for both time-lapse photography and normal moving image photograph, the initial values thereof will be appropriately set in this way.

In other words, for moving image photography (moving image playback), it is necessary to decide the photographing parameters by considering the influences, on a person viewing a moving image, caused by state changes of the moving image produced due to, for example, a relatively rapid state change of a subject within the photographing range of the camera, a relatively moderate state change of an overall photographing environment including a range beyond the photographing range, etc. Specifically, a method for causing the photographic parameter relating to image quality to track a state change and a tracking speed are important.

On the other hand, for normal moving image photography, since the photographing speed and playback speed are the same and the overall photographing time (playback time) is short, the influence on a person viewing caused by a state change of the overall photographing environment is small. Therefore, it has been sufficient to decide the tracking method and the tracking speed of the photographing parameters relating to image quality by considering only the relatively rapid state change of a subject.

However, in time-lapse photography, since the speed of photography and the speed of playback differ greatly and the overall photographing time (playback time) is a long time, the influence of a state change in the overall photographing environment on a user becomes great. Therefore, it is necessary to decide the tracking method and the tracking speed of the photographing parameters relating to image quality by considering these changes.

In the present embodiment, since the tracking method and the tracking speed of the photographing parameters relating to image quality are decided by considering such characteristics of time-lapse photography, it is possible to obtain moving image data that can be more easily viewed.

Furthermore, the speed of a relatively rapid state change of a subject within a photographing range of a camera and a relatively moderate state change of the overall photographing environment including a range beyond the photographing range differ from each photographic scene. In the present embodiment, it is possible to obtain moving image data that can be even more easily viewed by performing photography by changing the tracking method and the tracking speed of the photographing parameters relating to image quality for each photographic scene.

However, even if various parameters (photographic parameters relating to photography and image quality) are provided in advance to correspond to the photographic scenes, it will be difficult for a user without knowledge of time-lapse photography to set the conditions for photography (photographing interval, photographing time, exposure, white balance, etc.) according to the photographed subject and photographing conditions of time-lapse photography. However, with the image capture apparatus 1, since the photographing parameters are preset, it becomes convenient with good efficiency upon simply enjoying time-lapse photography, without carrying out the learning of difficult knowledge.

In addition, the parameter table can be modified by the user later. In other words, the values of the photographing parameters are automatically set according to the selected photographic scene; however, subsequent changes thereto by the user are possible.

After the initial values for "photographing interval" and "photographing time" have been automatically set according to the selected photographic scene, in the case of the values thereof having been changed by the user, the finally changed contents are stored for each photographic scene (last memorized), and the finally changed values are automatically set in place of the initial values upon the next scene selection.

In addition, a parameter table for user setting is separately saved in the parameter table, and can be used in time-lapse photography. It should be noted that, although not illustrated, the parameter table for user setting is stored together with other parameter tables (parameter table for time-lapse photography and parameter table for photography of normal moving image) in the parameter storage unit 71.

Referring back to FIG. 3, the previously set values of photographing parameters finally stored are stored in the last memory unit 72 with the later setting change by the user as memory storage.

Data of various images such as captured images, constitutional images and time-lapse moving images are stored in the image storage unit 73.

The photographic scene selection unit 51 performs selection of a photographic scene. The photographic scene is selected from among a plurality of photographic scenes decided in advance based on the result of judgment of photographing conditions including the photographing environment and photographed subject, or is selected arbitrarily by the user from among the plurality of photographic scenes decided in advance.

The judgment of photographing conditions, for example, is performed using a well-known technique such as performing by analyzing a captured image acquired from the image capture unit 16.

It should be noted that, as the photographic scenes of the present embodiment, similarly to the "photographic scenes" of the photographing parameters shown in FIG. 4, it is possible to select from "standard", "cloud", "nightscape", "evening", "vehicle", "townscape", "HDR art", "toy camera", "monochrome", "miniature", "fish eye" and "user settings".

The photographing parameter judgment unit 52 judges the photographing parameters corresponding to the selected scene selected by the photographic scene selection unit 51. In detail, the photographing parameter judgment unit 52 judges whether there is a variable parameter in the photographing parameters corresponding to the selected scene. In addition, the photographing parameter judgment unit 52 judges whether there is memory storage in the last memory unit 72.

The photographing condition judgment unit 53 judges the photographing conditions immediately before photography start and during photography by the image capture unit 16.

Judgment of the photographing conditions, for example, is performed using a well-known technique such as performing by analyzing a captured image acquired from the image capture unit 16.

The parameter setting unit 54 performs setting of the image capture control unit 55, image acquisition unit 56 and time-lapse moving image generation unit 57, by calling values of the photographing parameters for setting from the parameter storage unit 71 and last memory unit 72 as the initial values, based on the judgment results of the photographing parameter judgment unit 52.

More specifically, the parameter setting unit 54 performs setting related to the control of the image capture unit 16 (photographing conditions) in the image capture control unit 55, performs setting related to the timing of image acquisition in the image acquisition unit 56, and performs setting related to the generation of a time-lapse moving image in the time-lapse moving image generation unit 57.

In addition, the parameter setting unit 54 performs successive resetting of photographing parameters based on the judgment results of photographing conditions immediately before photography start and during photography (more specifically, immediately before image acquisition) by way of the photographing condition judgment unit 53.

It should be noted that, in the present embodiment, the parameter setting unit 54 performs successive resetting of values according to the photographing conditions, in the case of there being a parameter for which the value is made variable along with a change in photographing environment, among the values of photographing parameters set.

The image capture control unit 55 controls the image capture unit 16 based on the photographing parameters set by the parameter setting unit 54. More specifically, the image capture control unit 55 controls the image capture unit 16 in regards to image quality, photographing interval, photographing time, etc. to cause interval photography to be carried out.

The image acquisition unit 56 acquires captured images outputted from the image capture unit 16. In detail, the image acquisition unit 56 acquires, from among the captured images outputted from the image capture unit 16, captured images outputted at the photographing interval set by the parameter setting unit 54 as constitutional images. The captured images thus acquired are outputted to the time-lapse moving image generation unit 57.

The time-lapse moving image generation unit 57 successively compression encodes the captured images outputted from the image acquisition unit 56, and outputs as constitutional images to be stored in the image storage unit 73.

In addition, the time-lapse moving image generation unit 57 acquires a plurality of constitutional images from the image storage unit 73, and gathers into a file as one moving image to generate a time-lapse moving image based on the photographing parameters set by the parameter setting unit 54.

The output control unit 58 controls the output unit 18 so as to display and output captured images outputted from the image capture unit 16.

In addition, the output control unit 58 executes sleep processing.

"Sleep processing" turns off display output of the output unit 18 in a non-photographing period while maintaining operation of interval photography during time-lapse photography processing, thereby entering a sleep state.

Various conditions are considered as the conditions for turning off display output during non-photography operation; however, for example, the condition may be established as a case of a predetermined time elapsing without any operations, etc., or the temperature of the output unit 18 having reached at least a predetermined value.

In addition, during time-lapse photography, the output control unit 58 updates the display contents of the output unit 18 at each interval of acquisition of a captured image by the image acquisition unit 56, irrespective of the ON/OFF setting of the display output. In other words, the output control unit 58 controls the output unit 18 so as to perform display output to be associated with the photographing interval. For this reason, the user can confirm by the output unit 18 what kind of constitutional image constituting the time-lapse moving image has been acquired immediately, even in a case of turning the display ON from the display OFF state.

Next, the flow of time-lapse photography processing executed by such an image capture apparatus 1 will be explained.

Figure 5:
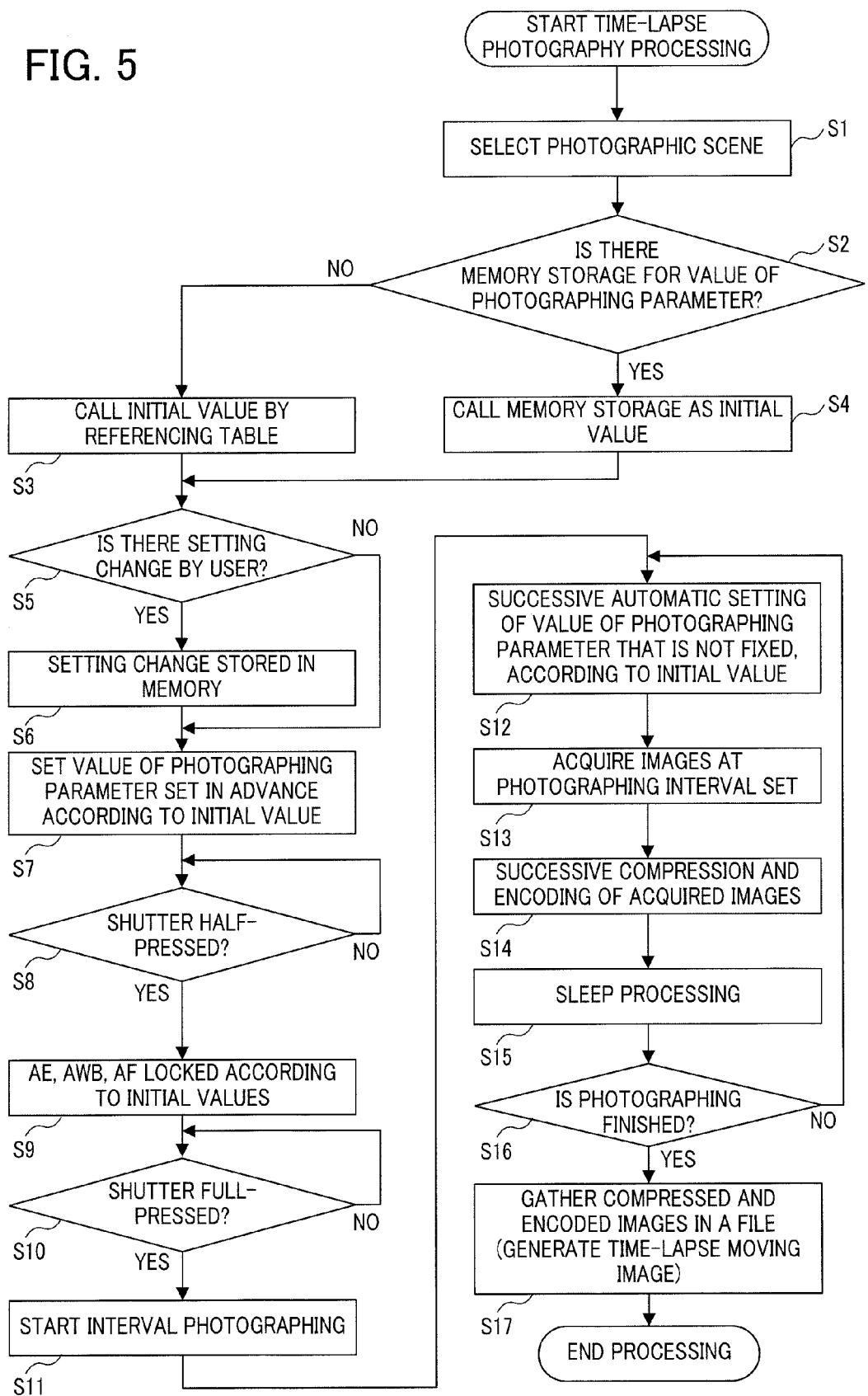
FIG. 5 is a flowchart illustrating the flow of time-lapse photography processing executed by the image capture apparatus of FIG. 1 having the functional configuration of FIG. 3.

FIG. 5 is a flowchart illustrating the flow of time-lapse photography processing executed by the image capture apparatus of FIG. 1 having the functional configuration of FIG. 3.

The time-lapse photography processing is initiated by an operation of time-lapse photography processing start on the input unit 17 by the user.

In Step S1, the photographic scene selection unit 51 performs selection of the photographic scene. In detail, the photographic scene selection unit 51 judges an image captured by the image capture unit 16, and based on the judgment results, selects a corresponding photographic scene from among the stored photographic scenes.

In Step S2, the photographing parameter judgment unit 52 judges whether there is memory storage for the value of a photographing parameter.

In the case of the value of a photographing parameter not being stored in the last memory unit 72, it is judged as NO in Step S2, and the processing advances to Step S3.

In contrast, in the case of the value of a photographing parameter being stored in the last memory unit 72, it is judged as YES in Step S2, and the processing advances to Step S4.

In Step S3, the parameter setting unit 54 calls the initial value by referencing the table of photographing parameters stored in the parameter storage unit 71. In other words, the parameter setting unit 54 references the table data of the photographing parameters stored in the parameter storage unit 71, and calls the values of photographing parameters corresponding to the selected photographic scene as the initial values. For example, in the case of the photographic scene "nightscape" being selected, "3: photographic scene: nightscape" of FIG. 4A comes to be called.

In Step S4, the parameter setting unit 54 calls the memory storage stored in the last memory unit 72 as the initial values. In other words, the parameter setting unit 54 calls the value of the photographing parameters arbitrarily inputted by the user among the photographing parameters stored in the parameter setting unit 71, and the other photographing parameters are called by referencing the table data.

In Step S5, the photographing parameter judgment unit 52 judges whether there is a setting change by the user. In other words, the photographing parameter setting unit 52 judges whether there is an operation of setting change to the input unit 17 and there is a change in the called initial values.

In the case of there not being a setting change by the user, it is judged as NO in Step S5, and the processing advances to Step S7.

In contrast, in the case of there being a setting change by the user, it is judged as YES in Step S5, and the processing advances to Step S6.

In Step S6, the parameter setting unit 54 stores the setting change in the last memory unit 72.

In Step S7, the parameter setting unit 54 sets the values of the photographing parameters set in advance according to the initial values.

In Step S8, the image capture control unit 55 judges whether the shutter has been half-pressed.

In the case of the shutter not being half-pressed, it is judged as NO in Step S8, and enters a standby state until the shutter is half-pressed.

In contrast, in the case of the shutter having been half-pressed, it is determined as YES in Step S8, and the processing advances to Step S9.

In Step S9, the image capture control unit 55 locks the AE, AWB and AF according to the initial values. More specifically, the image capture control unit 55 performs locking of the AE, AWB and AF in the image capture unit 16, based on the set values of the photographing parameters. Upon doing so, the photographing condition judgment unit 53 performs judgment of the photographing conditions, and the values of the photographing parameters are reset according to these judgment results. In other words, photographing is performed by the image capture unit 16 with the most recent optimum values.

For example, in the case of the "nightscape" photographic scene being selected, AE (fixed at value immediately before photography), AWB (fixed at value immediately before photography) and AF are locked as shown in FIG. 4A.

In Step S10, the image capture control unit 55 judges whether the shutter has been fully pressed.

In the case of the shutter not being fully pressed, it is judged as NO in Step S10, and enters a standby state until the shutter is fully pressed.

In contrast, in the case of the shutter being fully pressed, it is judged as YES in Step S10, and the processing advances to Step S11.

In Step S11, the image capture control unit 55 initiates interval photography. In other words, the image capture control unit 55 initiates interval photography based on the set values of photographing parameters.

In Step S12, the parameter setting unit 54 successively automatically sets the values of photographing parameters that are not fixed according to the initial values. In other words, the parameter setting unit 54 successively sets the photographing parameters to correspond to changes during photography. In order to deal with changes during photography, judgment of the photographing conditions is performed by the photographing condition judgment unit 53, and setting of the photographing parameters is performed once again by the parameter setting unit 54.

In Step S13, the image acquisition unit 56 acquires a captured image at the set photographing interval. Subsequently, the image acquisition unit 56 outputs an acquired captured image to the time-lapsed moving image generation unit 57.

In Step S14, the time-lapse moving image generation unit 57 successively compresses and encodes the acquired captured images to acquire constitutional images. Subsequently, the time-lapse moving image generation unit 57 stores the constitutional images thus generated in the image storage unit 73.

In Step S15, the output control unit 58 executes sleep processing on the output unit 18.

In sleep processing, display is turned OFF (sleep) in a non-photographing period, while periodic photographing operations continue during time-lapse photography. The output control unit 58 establishes a case of a setting time elapsing without operation or the temperature reaching at least a predetermined value as the display-OFF condition in the non-photographing period. In addition, the output control unit 58 updates the display contents of the output unit 18 to match the acquisition timing of images by the image acquisition unit 56, in the case of display being turned ON during time-lapsed photography. On the other hand, in the case of display being turned OFF (sleep) during time-lapse photography, notification such as of an LED flashing is performed to indicate being during time-lapse photography.

In addition, the OFF state of display in a non-photographing period may be changed according to the photographing time.

In Step S16, the CPU 11 judges whether photographing has ended. In other words, the CPU 11 judges whether an operation to end photography has been made on the input unit 17.

In the case of photography not ending, it is judged as NO in Step S16, the processing returns to Step S12, and the processing of Steps S12 to S16 is repeated.

In contrast, in the case of photography ending, it is judged as YES in Step S16, and the processing advances to Step S17.

In Step S17, the time-lapse moving image generation unit 57 gathers the compression encoded images into a file. In other words, the time-lapse moving image generation unit 57 combines the acquired and compression encoded constitutional images and gathers into one file, then generates a time-lapse moving image at the photographing frame rate of 20 fps irrespective of the photographic scene.

Subsequently, the time-lapse photography processing ends.

Second Embodiment

In the present embodiment, in addition to the functions of the aforementioned embodiment, it is configured to further add functions enabling the playback of the time-lapse moving image to be performed to match the photographic scene. It should be noted that the explanations of configurations similar to the aforementioned embodiment will be omitted hereinafter. In other words, the explanations of common parts with the hardware configuration of FIG. 1 and functional configuration of FIG. 3 will be omitted.

More specifically, in the present embodiment, for a time-lapse moving image generated at a photographing frame rate that is shared irrespective of the photographic scene during photography, it is configured so that the frame rate during playback (hereinafter referred to as "playback frame rate") set so as to be favorably play back for each photographic scene and the playback time are provided in the parameter table.

The parameter setting unit 54 sets the playback frame rate.

In detail, the parameter setting unit 54 references additional information of the moving image to be played back (hereinafter referred to as "playback file"), and as attribute information, acquires the type of file (either type of a moving image from time-lapse photography or a moving image from normal photography), and information of the photographic scene.

Then, the parameter setting unit 54 references the type of file thus acquired and the corresponding parameter table based on the photographic scene, and makes settings of the playback frame rate corresponding to the photographic scene.

The output control unit 58 controls the output unit 18 so as to cause the time-lapse moving image to be played back and output at the playback frame rate set by way of the parameter setting unit 54.

It should be noted that, in the present embodiment, attribute information of the type of file (either type of a moving image from time-lapse photography or a moving image from normal photography) and the photographic scene is made to be stored during moving image generation by the time-lapse moving image generation unit 57 in the additional information of the time-lapse moving image.

Herein, the parameter table of the present embodiment will be explained. FIG. 6 provides other specific examples of parameter tables.

The parameter table of the present embodiment adds a playback parameter in addition to the example of the aforementioned embodiment.

More specifically, the parameter table associates the photographic scene with photographing parameters and playback parameter, as shown in FIG. 6A.

The playback parameter is associated with the photographic scene in the time-lapse photography, and consisting of the playback frame rate upon playing back the moving image and the playback time. The playback frame rate is a frame rate set for special playback in order to smoothly playback the captured images acquired at the photographing interval so as not to be too fast or too slow.

In addition, from the viewpoint of playback frame rate setting, for example, it is configured so as to be an appropriate value at which the flow of time is played back faster than the actual time according to the photographic scene.

In the case of "photographic scene: standard", it is "playback time: 30 sec" at "playback frame rate: 20 fps"; in the case of "photographic scene: cloud", it is "playback time: 24 sec" at "playback frame rate: 15 fps"; in the case of "photographic scene: nightscape", it is "playback time: 40 sec" at "playback frame rate: 15 fps"; in the case of "photographic scene: evening", it is "playback time: 12 sec" at "playback frame rate: 30 fps"; in the case of "photographic scene: vehicle", it is "playback time: 60 sec" at "playback frame rate: 20 fps"; in the case of "photographic scene: townscape", it is "playback time: 30 sec" at "playback frame rate: 20 fps"; in the case of "photographic scene: HDR art", it is "playback time: 30 sec" at "playback frame rate: 20 fps"; in the case of "photographic scene: toy camera", it is "playback time: 30 sec" at "playback frame rate: 20 fps"; in the case of "photographic scene: monochrome", it is "playback time: 30 sec" at "playback frame rate: 20 fps"; in the case of "photographic scene: miniature", it is "playback time: 30 sec" at "playback frame rate: 20 fps"; and in the case of "photographic scene: fish eye", it is "playback time: 30 sec" at "playback frame rate: 20 fps".

By setting the playback frame rates in this way, for example, it is made possible to slowly appreciate the transition of nightscape even though it is made in time lapse by playing back the playback frames of 20 fps for "photographic scene: standard" at 15 fps for "photographic scene: nightscape", and conversely, possible to appreciate more quickly while feeling the dynamics by playing back at 30 fps for "photographic scene: evening".

It should be noted that, in the case of playing back a moving image of normal moving image photography, the playback frame rate is configured so as to be based on the frame rate during moving image photography (hereinafter referred to as "photography frame rate") in the normal moving image photography, as shown in FIG. 6B.

Next is a flowchart illustrating the flow of moving image playback processing executed in the present embodiment.

Figure 7:
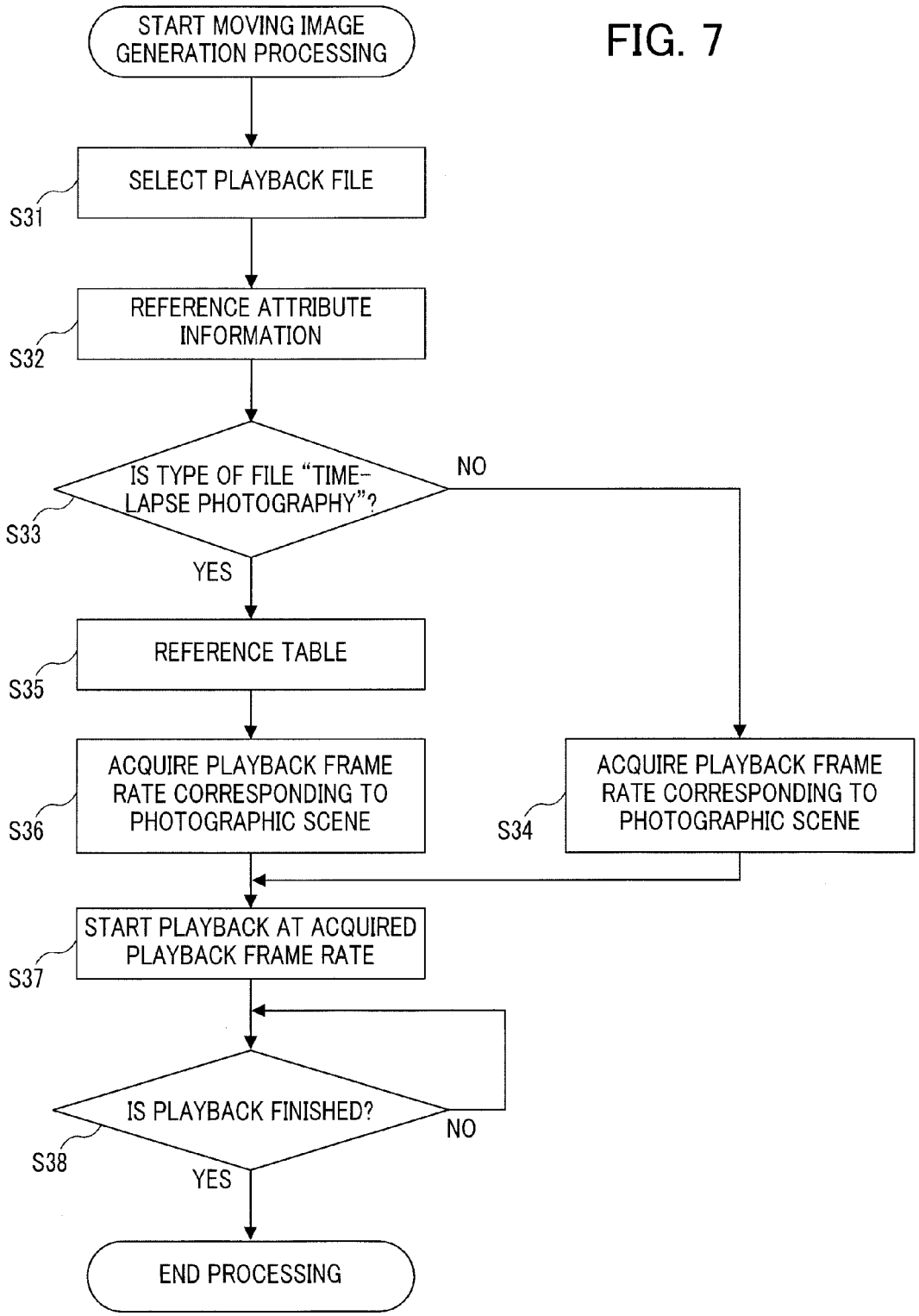
FIG. 7 is a flowchart illustrating the flow of moving image playback processing executed by the image capture apparatus of FIG. 1 having the functional configuration of FIG. 3.

FIG. 7 is a flowchart illustrating the flow of moving image playback processing executed by the image capture apparatus 1 of FIG. 1 having the functional configuration of FIG. 3.

The moving image playback processing is initiated according to an operation of moving image playing processing start on the input unit 17 by the user.

In Step S31, the parameter setting unit 54 selects a playback file. In other words, the parameter setting unit 54 selects a playback file for which playback is desired, from among the moving image files stored in the image storage unit 73, according to an operation, etc. to the input unit 17 from the user.

In Step S32, the parameter setting unit 54 references the attribute information, which is additional information of the selected playback file. As a result thereof, the parameter setting unit 54 acquires, from the attribute information, the type of file (either type of a moving image from time-lapse photography or a moving image from normal photography) and the photographic scene.

In Step S33, the parameter setting unit 54 judges whether the type of file is "time-lapse photography".

In the case of not being "time-lapse photography", it is judged as NO in Step S33, and the processing advances to Step S34.

In Step S34, the parameter setting unit 54 acquires the photographing frame rate as the playback frame rate. In other words, the parameter setting unit 54 acquires the photographing frame rate as the playback frame rate, as shown in FIG. 6B, due to being normal moving image photographing rather than time-lapse photography.

In contrast, in the case of being "time-lapse photography", it is judged as YES in Step S33, and the processing advances to Step S35.

In Step S35, the parameter setting unit 54 references the parameter table. In other words, the parameter setting unit 54 references the playback frame rate associated with the photographic scene, as shown in FIG. 6A. More specifically, in the case of being "photographic scene: nightscape", it references "playback frame rate: 15 fps".

In Step S36, the parameter setting unit 54 acquires the playback frame rate corresponding to the photographic scene. More specifically, in the case of being "photographic scene: nightscape", the parameter setting unit 54 acquires "15 fps" as the playback frame rate.

In Step S37, the output control unit 58 initiates playback at the playback frame rate acquired by way of the parameter setting unit 54. More specifically, the output control unit 58, in the case of being a time-lapse moving image and "photographic scene: nightscape", performs reconstruction of the moving image and output control so as to perform playback as "playback frame rate: 15 fps". In addition, in the case of being normal photography, it performs reconstruction of moving image and output control so as to perform playback at the photographing frame rate acquired as the playback frame rate.

In Step S38, the output control unit 58 judges whether playback has ended.

In the case of playback not having ended, it is judged as NO in Step S38, and enters a standby state until playback ends.

In the case of playback having ended, it is judged as YES in Step S38, and moving image playback processing ends.

Therefore, with the image capture apparatus 1, it is possible to appropriately perform playback of a time-lapse moving image according to the photographed subject and photographing conditions.

The image capture apparatus 1 configured in the above way includes the photographic scene selection unit 51 and parameter setting unit 54.

The photographic scene selection unit 51 selects the photographic scene.

The parameter setting unit 54 independently sets, according to the photographic scene selected by the photographic scene selection unit 51, each of the photographing parameters relating to time-lapse photography that captures images at a predetermined interval and generates a moving image with a playback time shorter than the photographing time, and the playback parameters relating to playback of the time-lapse moving image captured at the photographing parameters.

In the image capture apparatus 1, by setting the playback parameters according to the photographic scene independently from the photographing parameters, it is thereby possible to perform playback matching the photographic scene.

For example, by playing back a nightscape scene having a photographing interval of 3 seconds and playback frame rate of 20 fps at 15 fps, it is made possible to slowly appreciate the transition of the nightscape, even though it is made in time lapse, and by playing back at 30 fps an evening scene having a photographing interval of 10 seconds and playback frame rate of 20 fps, it is possible to appreciate more quickly while feeling the dynamics.

The parameter setting unit 54 sets the playback parameters to appropriate values at which the flow of time is played back faster than the actual time according to the photographic scene.

With the image capture apparatus 1, it is thereby possible to perform appropriate playback according to the photographic scene.

In addition, with the image capture apparatus 1, the playback parameters at least include a playback frame rate.

The parameter setting unit 54 sets the playback frame rate independently from the photographing interval included in the photographing parameters.

By setting the playback parameters according to the photographic scene independently from the photographing parameters, with the image capture apparatus 1, it is thereby possible to perform playback matching this photographic scene.

Among the types of photographing parameters, the parameter setting unit 54 further sets each of the photographing parameters relating to time and the photographing parameters relating to image quality independently.

In addition, the image capture apparatus 1 further includes the image capture control unit 55 that performs control of photography at the values of photographing parameters set by the parameter setting unit 54.

It is thereby possible for setting of photographing parameters according to the various photographing conditions to be performed with the image capture apparatus 1, since the photographing parameters relating to time and the photographing parameters relating to image quality are each set independently according to the photographing conditions.

Therefore, with the image capture apparatus 1, it is possible to perform time-lapse photography appropriately according to the photographed subject and photographing conditions.

In addition, the photographing parameter judgment unit 52 judges, according to the photographic scene selected by the photographic scene selection unit 51, whether to fix the tracking method of a photographing parameter relating to image quality or the value causing the tracking speed to change during time-lapse photography.

In addition, the parameter setting unit 54 further resets the photographing parameters relating to image quality in time-lapse photography according to the judged results.

According to the photographing conditions, it is judged and set whether to fix the tracking method like whether or not to track, or the value causing the tracking speed like performing tracking in real time or performing loosely to change, for a photographing parameter relating to image quality during time-lapse photography; therefore, with the image capture apparatus 1, it is thereby possible to prevent the captured image from changing frequently, becoming difficult to see and unnatural.

In addition, the photographing parameter judgment unit 52 judges whether to fix the value for each type of photographing parameter relating to image quality.

With the image capture apparatus 1, it is thereby possible to perform setting of photographing parameters relating to image quality more appropriately, since it is judged whether to fix the value for each type of photographing parameter relating to image quality.

In addition, the parameter setting unit 54 sets the photographing parameters relating to image quality of different values for each photographic scene selected by the photographic scene selection unit 51, in the case of the photographing parameter judgment unit 52 judging to fix the values of photographing parameters relating to image quality.

With the image capture apparatus 1, it is thereby possible to perform setting of photographing parameters relating to image quality more appropriately, since even in a case of fixing the values of photographing parameters relating to image quality, the values thereof are made to change according to the photographing conditions.

In addition, the parameter setting unit 54 sets the values of photographing parameters to preset values in the case of the photographing parameter judgment unit 52 judging to fix the values of the photographing parameters relating to image quality.

With the image capture apparatus 1, appropriate setting of photographing parameters relating to image quality is thereby carried out without being influenced by the state prior to photography start, due to setting to preset values in the case of fixing the values of photographing parameters relating to image quality.

In addition, the parameter setting unit 54 sets the values of photographing parameters relating to image quality to the values before time-lapse photography starts, in the case of the photographing parameter judgment unit 52 judging to fix the values of the photographing parameters relating to image quality.

With the image capture apparatus 1, due to setting to values at the moment of starting in the case of fixing the values of photographing parameters relating to image quality, it is thereby possible to perform appropriate setting of photographing parameters relating to image quality, even in a case of the appropriate settings differing depending on the state prior to photography start, but it being better not to change during photography.

In addition, the parameter setting unit 54 successively sets the values of photographing parameters relating to image quality automatically during time-lapse photography, in the case of the photographing parameter judgment unit 52 judging not to fix the values of photographing parameters relating to image quality.

With the image capture apparatus 1, due to successively setting automatically during photography in the case of not fixing the values of photographing parameters relating to image quality, it is thereby possible to perform appropriate setting of photographing parameters relating to image quality in the case of being better off tracking the changes of the subject.

The values of the photographing parameters relating to image quality in time-lapse photography that are set by the parameter setting unit 54 differ from the photographing parameters relating to image quality in normal photography at the same photographing conditions as judged by the photographing parameter judgment unit 52.

With the image capture apparatus 1, by configuring so as to differentiate the values of photographing parameters between time-lapse photography and normal photography, it is thereby possible to handle the peculiarities characteristic of time-lapse photography that differ from normal photography.

In addition, the image capture apparatus 1 includes the storage unit 19 (parameter storage unit 71 and last memory unit 72).

The storage unit 19 (parameter storage unit 71 and last memory unit 72) stores the values for each type of photographing parameter for each photographic scene.

The parameter setting unit 54 reads the values of photographing parameters stored in the storage unit 19 and sets according to the photographic scene selected by the photographic scene selection unit 51, and changes the set values of photographing parameters. In addition, the parameter setting unit 54 updates the values of photographing parameters stored in the storage unit 19 with the changed photographing parameters. Furthermore, the parameter setting unit 54 controls the reading of values of photographing parameters, or updating of values of photographing parameters at predetermined conditions.

The image capture control unit 55 performs intermittent photography continually at the values of photographing parameters set by the parameter setting unit 54 for each photographic scene.

With the image capture apparatus 1, it is thereby possible to prevent currently inappropriate photography at values of photographing parameters changed to match the previous photographing conditions, while enabling photographing at appropriate photographing parameters according to the photographing conditions and preferences, thereby further enabling the effort for returning the values of photographing parameters to original to be reduced.

The parameter setting unit 54 causes predetermined conditions for performing the reading of values of photographing parameters or updating of the values of photographing parameters to vary between the photographing parameters relating to time and photographing parameters relating to image quality.

With the image capture apparatus 1, appropriate control of photographing parameters thereby becomes possible by separating the photographing parameters relating to time which have little influence even if changing according to preference, and the parameters relating to image quality having been influenced by using a previous change also currently.

In addition, the storage unit 19, for example, stores both the values of photographing parameters at initial settings in the parameter storage unit 71, and the values of photographing parameters of user designation in the last memory unit 72.

The parameter setting unit 54 updates the values of photographing parameters of user designation stored in the last memory unit 72.

The parameter setting unit 54 controls the reading of values of photographing parameters so as to read the values of photographing parameters of user designation and set in the case of the values of photographing parameters of user designation being stored in the last memory unit 72, and to read the values of photographing parameters of initial settings and set in the case of the values of photographing parameters of user designation not being stored in the last memory unit 72.

With the image capture unit 1, it is thereby not only possible to set values of standard photographing parameters easily by providing initial settings, but also thereby further possible to change the values of photographing parameters according to the photographing conditions or preferences.

It should be noted that, in the present embodiment, it may be configured so as to cause permanent user settings irrespective of the photographing conditions to be stored in the parameter storage unit 71. In this case, by combining with the last memory unit 72, it is possible to perform appropriate photography taking consideration of the plan of the user and influences from the photographing conditions, and it is possible to reduce the user's effort such as for a setting operation.

The storage unit 19 (parameter storage unit 71 and last memory unit 72) stores the values for each type of photographing parameter including photographing interval or total photographing time for each photographic scene.

The parameter setting unit 54 controls the predetermined conditions for performing reading of values of photographing parameters or performing updating of values of photographing parameters to vary for each photographic scene.

With the image capture apparatus 1, photographing thereby becomes possible at more appropriate values of photographing parameters by changing the settings for each photographic scene.

The parameter setting unit 54 controls so as to perform updating of the values of photographing parameters for all types of photographing parameters in one among the photographic scenes.

With the image capture apparatus 1, it thereby becomes possible to intentionally reproduce unique photography easily like an image quality that is not standard. In addition, as the initial values of photographing parameters, it may have values like those impart a unique effect different from the actual photographing environment as a photographic scene (for example, "HDR art" or "fish eye").

The last memory unit 72 updates and stores the newest values of photographing parameters changed by the parameter setting unit 54.

With the image capture apparatus 1, it thereby becomes possible to reproduce photography at the latest values of photographing parameters, even in a case like the preferences having changed.

The photographing parameters relating to image quality are at least any one among exposure, white balance and focus.

With the image capture apparatus 1, it is thereby possible to appropriately perform setting, in any combination, the types of photographing parameters relating to image quality serving as the basis.

The photographing parameter relating to time is the photographing interval or photographing time.

With the image capture apparatus 1, it is thereby possible to appropriately perform setting, in any combination, the photographing parameter relating to time serving as the basis.

In addition, the image capture apparatus 1 further includes the time-lapse moving image generation unit 57 that compression encodes a plurality of images captured and obtained by the image capture control unit 55 so as to generate moving image data to be played back with a flow of time that is faster than actual time.

With the image capture apparatus 1, moving image data of a time perception that is not obtained in normal photography is thereby obtained. In addition, the generated moving image can be handled similarly to a moving image of normal photography.

In addition, the image capture apparatus 1 further includes the output control unit 58 that performs control of playback at the set values of playback parameters.

With the image capture apparatus 1, it is thereby possible to perform playback control matching the photographic scene.

In addition, the photographic scene selection unit 51 selects the photographic scene based on the movement conditions of the subject. Furthermore, the parameter setting unit 54 sets the photographing parameter relating to time according to the photographic scene selected based on the movement conditions of the subject by the photographic scene selection unit 51.

With the image capture apparatus 1, photography that can sense the change of a subject that is the photographed subject thereby becomes possible by configuring so as to set the photographing parameters relating to time according to the movement conditions of the subject.

It should be noted that the present invention is not to be limited to the aforementioned embodiment, and that modifications, improvements, etc. within a scope that can achieve the objects of the present invention are also included in the present invention.

In the aforementioned embodiment, it is configured so as to automatically decide both the photographing parameter relating to time and the photographing parameters relating to image quality according to the photographic scene; however, it may be configured so as to let the user select the photographic scene and the photographing parameter relating to time, and then automatically decide the photographing parameters relating to image quality according to the photographic scene and photographing parameter relating to time selected by the user.

In addition, in the aforementioned embodiment, only the presence of tracking of photographing parameters relating to image quality according to the photographic scene is decided (tracking/lock); however, it may be configured so as to variably control the speed of tracking of the photographing parameters relating to image quality according to the photographic scene in a plurality of stages.

In addition, the photographing parameter relating to time may be the same value in all photographic scenes.

Furthermore, in the aforementioned embodiment, the last updated value is stored in the last memory unit 72 for a photographing parameter; however, it is not limited thereto. For example, for photographing parameters other than "photographing interval" and "photographing time", it may be configured so as to set the initial values (default values) each time the photographing conditions are judged, without storing the last changed values.

In addition, in the aforementioned embodiment, photographing parameters that are changeable by the user and the values of the photographing parameters are not provided; however, it is not limited thereto. For example, it may be configured so as to predefine the initial value of a photographing parameter and a range variable by the user for each photographing condition.

In addition, in the aforementioned embodiment, in the case of "standard" being selected as the photographing condition, it may be configured so as to store the last changed value also for photographing parameters other than "photographing interval" and "photographing time".

Furthermore, in the aforementioned embodiment, it may be configured so as to return the values of "photographing interval" and "photographing time" set by the user to the initial values with a reset operation.

Moreover, in the aforementioned embodiment, it may be configured so that the photographing parameter relating to time assumes the same value in all photographic scenes.

In addition, in the aforementioned embodiment, the constitutional images are configured so as to be captured at a predetermined time, and then captured images sequentially outputted are acquired at a predetermined interval; however, it is not limited thereto. The constitutional image may be produced by photographing static images each predetermined time, or it may be configured so as to use a moving image produced by photographing a moving image and thinning out each predetermined time from a normal moving image during photography.

In addition, in the aforementioned embodiment, successive compression encoding is performed on static images for each acquisition of an image; however, it is not limited thereto. For example, it may be configured so as to perform collective compression encoding when the acquired images reach a predetermined volume.

Furthermore, in the aforementioned embodiment, it is configured so as to perform control of playback with the set values of playback parameters by way of the output control unit 58; however, it is not limited thereto. The time-lapse moving image generation unit 57 may be configured so as to acquire a playback frame rate according to the photographic scene during moving image generation, and generate moving image data with this acquired playback frame rate as the photographing frame rate.

In addition, in the aforementioned embodiment, it is configured so as to acquire the playback frame rate by acquiring from additional information and referencing the parameter table from the photographic scene; however, it may be configured so as to record the playback frame rate as addition information upon photographing, and acquire the playback frame rate from the additional information upon playback.

Furthermore, in the aforementioned embodiment, the photographing parameters and the values of the photographing parameters that are changeable by the user are not provided; however, it is not limited thereto. For example, it may be configured so as to predefine the initial value of a photographing parameter and a range changeable by the user for each photographing condition.

More specifically, the storage unit 19 (parameter storage unit 71 and last memory unit 72) is configured so as to store a range of values for photographing parameters changeable for each type of photographing parameter, by way of the parameter setting unit 54. In addition, the parameter setting unit 54 is configured so as to change the value of a photographing parameter within the range stored in the storage unit 19 (parameter storage unit 71 and last memory unit 72).

By configuring in this way, the image capture apparatus 1 is configured so as not to allow changes to a clearly inappropriately value for the photographing parameter, thereby enabling a mistake of unnecessary photography to be prevented beforehand.

Furthermore, in the aforementioned embodiment, it may be configured so as to return the values of "photographing interval" and "photographing time" set by the user to the initial values with a reset operation on the input unit 17.

More specifically, the parameter setting unit 54, for example, is configured so as to reset the value of a photographing parameter stored in the storage unit 19 (parameter storage unit 71 and last memory unit 72) to the initial setting by way of a reset operation on the input unit 17.

By configuring in this way, it becomes possible to easily return to the initial setting with the image capture apparatus 1.

In the aforementioned embodiments, the digital camera has been described as an example of the image capture apparatus 1, which is an embodiment of the image processing apparatus, to which the present invention is applied, but the present invention is not limited thereto in particular.

For example, the present invention can be applied to any electronic device in general having a time-lapse photography processing function and a moving image playback processing function. More specifically, for example, the present invention can be applied to a lap-top personal computer, a printer, a television, a video camera, a portable navigation device, a smart phone, a cell phone device, a smart phone, a portable gaming device, and the like.

The processing sequence described above can be executed by hardware, and can also be executed by software.

In other words, the hardware configuration shown in FIG. 3 is merely an illustrative example, and the present invention is not particularly limited thereto. More specifically, the types of functional blocks employed to realize the above-described functions are not particularly limited to the example shown in FIG. 3, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

While the present invention has been described with reference to the preferred embodiments, it is intended that the invention be not limited by any of the details of the description therein but includes all the embodiments which fall within the scope of the appended claims.

What is claimed is:

1. An image processing apparatus comprising;
a photographic scene selection section that selects a photographic scene;
a storage section that independently stores, a photographing parameter relating to time-lapse photography that captures images at a predetermined interval and generates a moving image of a shorter playback time than a photographing time, and a value of a playback parameter relating to playing of a time-lapse moving image for each photographic scene, respectively, and
a parameter setting section that reads and sets a value of the playback parameter stored in the storage section according to the photographic scene selected by way of the photographic scene selection section,
wherein the storage section further independently stores, among types of the photographing parameters, each of photographing parameters relating to time and photographing parameters relating to image quality, wherein the parameter setting section reads and further sets a value of the photographing parameter relating to time and a value of the photographing parameter relating to image quality stored in the storage section according to a photographic scene selected by the photographic scene selection section when capturing a time-lapse moving image, and wherein the image processing apparatus further comprises an image capture control section that performs control of image capture of the time-lapse moving image at values of the photographing parameters set by way of the parameter setting section, and
wherein the storage section further stores whether to fix a tracking method of the photographing parameter or a value causing a tracking speed to change relating to image quality during time-lapse photography, and wherein the parameter setting section further reads and sets whether to fix the tracking method of the photographing parameter or the value causing the tracking speed to change relating to image quality during time-lapse photography stored in the storage section according to the photographic scene selected by the photographic scene selection section.

2. The image processing apparatus according to claim 1, wherein the storage section further stores whether to fix a value for each type of photographing parameter relating to image quality.

3. The image processing apparatus according to claim 1, wherein the parameter setting section further reads from the storage section and sets a value of the photographing parameter relating to image quality at a value that is different from each photographic scene selected by the photographic scene selection section, in the case of being stored in the storage section such that the value of the photographing parameter relating to image quality is fixed.

4. The image processing apparatus according to claim 1, wherein the parameter setting section reads from the storage section and successively sets the value of the photographing parameter relating to image quality automatically during time-lapse photography, in the case of being stored in the storage section such that the value of the photographing parameter relating to image quality is not fixed.

5. The image processing apparatus according to claim 1, wherein the storage section stores the value of the photographing parameter relating to image quality in time-lapse photography and the value of the photographing parameter relating to image quality in normal photography of the same photographic scene in different values.

6. The image processing apparatus according to claim 1, further comprising:
a change section that changes the value of the photographing parameter set by way of the parameter setting section;

an update section that updates the value of the photographing parameter stored in the storage section with a value of the photographing parameter changed by way of the change section; and a control section that controls, at a predetermined condition, reading of the value of the photographing parameter by way of the parameter setting section, or updating of the value of the photographing parameter by way of the update section, for each photographic scene.

7. The image processing apparatus according to claim 6, wherein the control section controls the predetermined condition for performing reading of the value of the photographing parameter by the parameter setting section or updating of the value of the photographing parameter by the update section to change between the photographing parameter relating to time and the photographing parameter relating to image quality.

8. The image processing apparatus according to claim 6, wherein the storage section stores both a value of a photographing parameter of an initial setting and a value of a photographing parameter of user designation, wherein the update section updates the value of the photographing parameter of the user designation, and wherein the control section controls reading of a value of a photographing parameter by the parameter setting section so as to read and set the value of the photographing parameter of user designation in the case of the value of the photographing parameter of user designation being stored in the storage section, and read and set the value of the photographing parameter of the initial setting in the case of the value of the photographing parameter of user designation not being stored in the storage section.

9. The image processing apparatus according to claim 8, further comprising a reset section that resets the value of the photographing parameter stored in the storage section to the initial setting.

10. The image processing apparatus according to claim 9, wherein the control section controls so as to perform updating of the value of the photographing parameter by way of the update section for all types of the photographing parameter in one among the photographic scenes.

11. The image processing apparatus according to claim 6, wherein the storage section updates and stores a newest value of the photographing parameter changed by way of the change section.

12. The image processing apparatus according to claim 6, wherein the storage section stores a range of values of the photographing parameter that is changeable by the change section for each type of the photographing parameter, and wherein the change section changes the value of the photographing parameter within the range stored in the storage section.

13. The image processing apparatus according to claim 1, wherein the photographing parameter relating to image quality is at least one among exposure, white balance and focus.

14. The image processing apparatus according to claim 1, wherein the photographing parameter relating to time is a photographing interval or a photographing time.

15. The image processing apparatus according to claim 1, further comprising a moving image generation section that compression encodes a plurality of images captured and obtained by way of the image capture control section, and generates moving image data to be played back with a flow of time that is faster than actual time.

16. The image processing apparatus according to claim 15, wherein the moving image generation section adds information relating to the photographic scene selected by the photographic scene selection section during capturing the moving image data generated as additional information of the moving image data generated.

17. The image processing apparatus according to claim 15, wherein the moving image generation section adds a playback parameter corresponding to the photographic scene selected by the photographic scene selection section during capturing the moving image data generated as additional information of the moving image data generated.

18. A method for processing images at an image processing apparatus including a storage section which stores independently a photographing parameter relating to time-lapse photography that captures images at a predetermined interval and generates a moving image of a shorter playback time than a photographing time, and a value of a playback parameter relating to playback of a time-lapse moving image for each photographic scene, respectively, the method comprising:

selecting a photographic scene; and reading and setting a value of the playback parameter stored in the storage section according to the selected photographic scene;

wherein the storage section further independently stores, among types of the photographing parameters, each of photographing parameters relating to time and photographing parameters relating to image quality, wherein the method further comprises reading and further setting a value of the photographing parameter relating to time and a value of the photographing parameter relating to image quality stored in the storage section according to a selected photographic scene when capturing a time-lapse moving image, and wherein the image processing apparatus further comprises an image capture control section that performs control of image capture of the time-lapse moving image at values of the set photographing parameters, and wherein the storage section further stores whether to fix a tracking method of the photographing parameter or a value causing a tracking speed to change relating to image quality during time-lapse photography, and wherein method further comprises reading and setting whether to fix the tracking method of the photographing parameter or the value causing the tracking speed to change relating to image quality during time-lapse photography stored in the storage section according to the selected photographic scene.

19. A non-transitory computer readable storage medium encoded with a program that enables a computer controlling an image processing apparatus including a storage section which stores independently a photographing parameter relating to time-lapse photography that captures images at a predetermined interval and generates a moving image of a shorter playback time than a photographing time, and a value of a playback parameter relating to playback of a time-lapse moving image for each photographic scene, respectively, image processing to realize:

a photographic scene selecting function of selecting a photographic scene; and a parameter setting function of reading and setting a value of the playback parameter stored in the storage section according to the selected photographic scene, wherein the storage section further independently stores, among types of the photographing parameters, each of photographing parameters relating to time and photographing parameters relating to image quality, wherein the parameter setting function includes reading and further setting a value of the photographing parameter relating to time and a value of the photographing parameter relating to image quality stored in the storage section according to a selected photographic scene when capturing a time-lapse moving image, and wherein the image processing apparatus further comprises an image capture control section that performs control of image capture of the time-lapse moving image at values of the set photographing parameters, and wherein the storage section further stores whether to fix a tracking method of the photographing parameter or a value causing a tracking speed to change relating to image quality during time-lapse photography, and wherein parameter setting function includes reading and setting whether to fix the tracking method of the photographing parameter or the value causing the tracking speed to change relating to image quality during time-lapse photography stored in the storage section according to the selected photographic scene.

* * * * *